(12) United States Patent
Yoganathan et al.

(10) Patent No.: US 10,567,571 B2
(45) Date of Patent: *Feb. 18, 2020

(54) LIMITING DISTRACTION FROM IN-VEHICLE PORTABLE DEVICES

(71) Applicant: Yazaki Corporation, Tokyo (JP)

(72) Inventors: Sivashankar Yoganathan, Moorpark, CA (US); Anand Ganesan Kaygee, Oak Park, CA (US); Michael David Dipperstein, Camarillo, CA (US); Roy Lujan Soto, Moorpark, CA (US)

(73) Assignee: Yazaki Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/035,555

(22) Filed: Jul. 13, 2018

(65) Prior Publication Data
US 2018/0324291 A1 Nov. 8, 2018

Related U.S. Application Data

(63) Continuation of application No. 15/331,750, filed on Oct. 21, 2016, now Pat. No. 10,044,853.
(Continued)

(51) Int. Cl.
*H04W 4/48* (2018.01)
*H04M 1/725* (2006.01)
(Continued)

(52) U.S. Cl.
CPC ... *H04M 1/72572* (2013.01); *H04M 1/72577* (2013.01); *H04W 4/021* (2013.01);
(Continued)

(58) Field of Classification Search
CPC ... H04W 12/02; H04W 12/04; H04W 12/104; H04W 4/003; H04W 4/005; H04W 4/008; H04W 4/04; H04W 4/046
(Continued)

(56) References Cited

U.S. PATENT DOCUMENTS 7,065,349 B2   6/2006   Nath et al.
7,904,219 B1   3/2011   Lowrey et al.
(Continued)

FOREIGN PATENT DOCUMENTS

CN   102170300 A   8/2011
CN   104348528 A   2/2015
(Continued)

OTHER PUBLICATIONS

Final Office Action dated Dec. 7, 2017 in U.S. Appl. No. 15/331,750.
(Continued)

*Primary Examiner* — Jean A Gelin
(74) *Attorney, Agent, or Firm* — Perkins Coie LLP; Jordan M. Becker

(57) ABSTRACT

Disclosed is a technique for managing communications of portable devices within a vehicle through an in-vehicle router system. The in-vehicle router system includes a plurality of out-of-band interfaces used to determine a user type associated with a portable device used to manage a connection with a wireless access point. The out-of-band interface receives a query from a portable device via a first communication link. The query includes identifying information of the portable device and a request for network credentials to a second communication link with a wireless access point. A user type is determined based on a location of the out-of-band interface and a unique identifier. Network credentials associated with the determined user type are retrieved. The network credentials are provided to the portable device via the first communication link. Access to the second communication link is restricted based on the user type and/or vehicle status information.

24 Claims, 8 Drawing Sheets

Related U.S. Application Data

(60) Provisional application No. 62/245,754, filed on Oct. 23, 2015.

(51) Int. Cl.
*H04W 4/021* (2018.01)
*H04W 4/80* (2018.01)
*H04W 4/02* (2018.01)
*H04W 4/40* (2018.01)
*H04W 4/42* (2018.01)
*H04M 1/60* (2006.01)

(52) U.S. Cl.
CPC .............. *H04W 4/025* (2013.01); *H04W 4/40* (2018.02); *H04W 4/42* (2018.02); *H04W 4/48* (2018.02); *H04W 4/80* (2018.02); H04M 1/6091 (2013.01)

(58) Field of Classification Search
USPC .... 455/410, 411, 414.1, 424, 425, 458, 459, 455/41.1, 41.2, 575.9, 90.1
See application file for complete search history.

(56) References Cited

U.S. PATENT DOCUMENTS

| | | | |
|---|---|---|---|
| 8,432,261 B2 | 4/2013 | Talty et al. | |
| 8,514,825 B1 | 8/2013 | Addepalli et al. | |
| 8,812,065 B2 | 8/2014 | Miller et al. | |
| 9,008,641 B2 | 4/2015 | Yang et al. | |
| 9,032,493 B2 | 5/2015 | Lortz et al. | |
| 9,253,589 B2 | 2/2016 | McCann et al. | |
| 9,521,238 B1* | 12/2016 | Thanayankizil | .... H04M 1/7253 |
| 9,813,897 B2 | 11/2017 | Manente | |
| 10,044,853 B2* | 8/2018 | Yoganathan | ............ H04W 4/80 |
| 2005/0039208 A1* | 2/2005 | Veeck | ...................... H04N 7/18 725/76 |
| 2005/0184860 A1* | 8/2005 | Taruki | .................. H04B 1/3877 340/441 |
| 2006/0031447 A1 | 2/2006 | Holt et al. | |
| 2011/0022254 A1* | 1/2011 | Johas Teener | ............ G06F 1/26 701/22 |
| 2011/0039581 A1* | 2/2011 | Cai | ......................... G01S 19/14 455/456.4 |
| 2011/0137520 A1 | 6/2011 | Rector et al. | |
| 2013/0217331 A1 | 8/2013 | Manente et al. | |
| 2013/0237148 A1 | 9/2013 | McCann et al. | |
| 2013/0260725 A1 | 10/2013 | Sharma et al. | |
| 2014/0040975 A1 | 2/2014 | Raleigh et al. | |
| 2015/0063329 A1 | 3/2015 | Pebbles et al. | |
| 2015/0121527 A1 | 4/2015 | Cho et al. | |
| 2015/0126171 A1 | 5/2015 | Miller et al. | |
| 2015/0138001 A1 | 5/2015 | Davies et al. | |
| 2015/0148018 A1 | 5/2015 | Peterson et al. | |
| 2015/0245109 A1* | 8/2015 | Couleaud | ........... H04N 21/2146 725/77 |
| 2016/0070527 A1* | 3/2016 | Ricci | ...................... G06F 3/165 715/716 |
| 2016/0234870 A1 | 8/2016 | Borges et al. | |
| 2017/0090987 A1 | 3/2017 | Hearn et al. | |
| 2018/0059913 A1* | 3/2018 | Penilla | ................. B60N 2/0228 |

FOREIGN PATENT DOCUMENTS

| | | |
|---|---|---|
| DE | 102012020900 A1 | 4/2013 |
| EP | 2770787 A1 | 8/2014 |
| JP | 2011-114741 A | 6/2011 |
| JP | 2015-012569 A | 1/2015 |
| JP | 2015513830 A | 5/2015 |
| JP | 2015-134556 A | 7/2015 |
| WO | 2013/123469 A1 | 8/2013 |
| WO | 2013165989 A2 | 11/2013 |
| WO | 2013189510 A1 | 12/2013 |

OTHER PUBLICATIONS

International Search Report and Written Opinion for International Application No. PCT/US2016/054198, dated Jan. 19, 2017.

Notice of Allowance dated Dec. 13, 2017 in U.S. Appl. No. 15/277,613.

International Search Report and Written Opinion for International Application No. PCT/US2016/058306, dated Feb. 2, 2017,Feb. 2, 2017.

Japanese Patent Application No. 2018-520595 filed Oct. 21, 2016, Notification of Reasons of Refusal dated Dec. 14, 2018.

Non-Final Office Action dated Jun. 15, 2017 in U.S. Appl. No. 15/331,750.

Notice of Allowance dated Apr. 10, 2018 in U.S. Appl. No. 15/331,750.

"Chinese First Office Action issued in Chinese Application No. 201680068964.7", dated Jan. 29, 2019.

\* cited by examiner

LIMITING DISTRACTION FROM IN-VEHICLE PORTABLE DEVICES

CROSS-REFERENCE TO RELATED APPLICATION(S)

This application is a continuation of U.S. patent application Ser. No. 15/331,750, titled "Limiting Distraction from In-Vehicle Portable Devices" and filed on Oct. 21, 2016, now U.S. Pat. No. 10,044,853, which claims the benefit of U.S. Provisional Patent Application No. 62/245,754, titled "System and Method for Limiting Driver Distraction from Portable Devices Brought into the Vehicle" and filed on Oct. 23, 2015; both of which are incorporated by reference herein in their entirety.

TECHNICAL FIELD

At least one embodiment of the technique introduced herein relates to wireless communication, and more particularly, to limiting distraction to a driver of a vehicle from in-vehicle portable devices.

BACKGROUND

Use of portable communication devices (e.g., phones, computers, tablets) by a driver of a vehicle can lead to driver distraction and increased safety risk. Portable devices, such as smartphones and tablet computers, have applications and/or operating system functions that indiscriminately limit incoming calls and text messages of any portable device in a vehicle.

DETAILED DESCRIPTION

Figure 1:
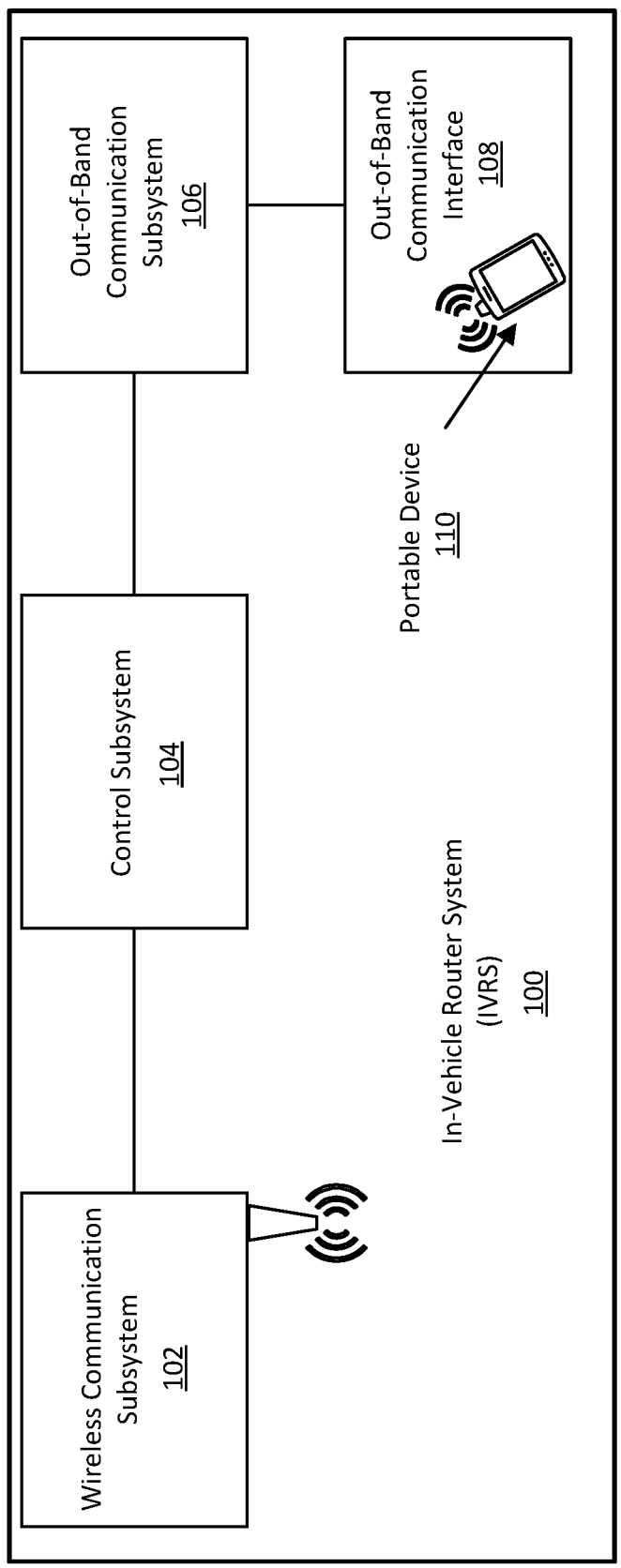
FIG. 1 is a block diagram illustrating an out-of-band communication between an in-vehicle router system and a portable device.

Use of portable communication devices (e.g., phones, computers, tablets) by a driver of a vehicle can lead to driver distraction and increased safety risk. In order to minimize driver distraction, it is essential to identify the driver's portable device among all the portable devices in the vehicle and manage the network communication of the driver's portable device. Conventional portable smart devices, such as smartphones and tablet computers, have applications and/or operating system functions that attempt to limit driver distraction by managing incoming calls and text messages. However, these solutions lack the ability to differentiate portable devices associated with the driver from portable devices of passengers. As a result, all portable devices within the vehicle may be managed as if they belong to the vehicle driver, resulting in user dissatisfaction and lack of effective driver distraction solutions.

The technique introduced here can resolve problems posed by conventional methods by managing wireless communications with a portable device based on a determination of whether the portable device is operated by a first user type or a second user type. The technique introduced here includes an in-vehicle router system (IVRS) that includes a plurality of out-of-band communication interfaces associated with a type of user (e.g., first user type or second user type) configured to communicate with portable devices. Out-of-band communication is communication on a channel separate from that used for a wireless communication subsystem in the vehicle. For example, a plurality of out-of-band interfaces can be designated for use in a communication channel that is out-of-band relative to a communication channel used by a wireless access point of a wireless communication subsystem in a vehicle. In response to communication between a portable device and an out-of-band interface, the in-vehicle router system classifies a user of the portable device as being of a first user type (e.g., a driver) or a second user type (e.g., a passenger). The in-vehicle router system manages communication with a portable device based on the determined classification of the user (e.g., driver or passenger). Certain privileges and/or limitations can be provided to a user of a particular type.

The IVRS can use short range out-of-band communication such as near field communication (NFC) or other short range communication methods to provide network access and service details to the portable devices, such as smartphones, tablet computers, wearable devices, or the like. An IVRS has multiple out-of-band communication modules located at various positions within the vehicle. A portable device requests access to in-vehicle services by communicating with the IVRS through an out-of-band communication module. The portable device's service request contains information that uniquely identifies the portable device to the IVRS. The IVRS in return provides the portable device with the in-vehicle network access and service details. The combination of the unique portable device details along with the position of the out-of-band communication module enables the IVRS to (1) discover and register portable devices brought into the vehicle and (2) establish appropriate service and connectivity restrictions based on device attributes, device registered location, and real-time vehicle status.

FIG. 1 is a block diagram illustrating an out-of-band communication between an in-vehicle router system (IVRS) 100 and a portable device 110. The IVRS 100 includes a wireless communication subsystem 102 (e.g., a Wi-Fi subsystem), control subsystem 104, out-of-band communication subsystem 106, and out-of-band communication interface 108 (e.g., a near field communication antenna pad).

The IVRS 100 and the portable device establish a wireless link (e.g., a secure near field communication link) via the out-of-band communication interface 108. The IVRS 100 provides the portable device 110 with the wireless network details via the wireless link. Wireless network details can include a service set identifier (SSID) and pre-shared key (PSK). The portable device 110 can connect to the wireless network subsystem using the network credentials received via the wireless link with the IVRS 100. The control subsystem 104 manages communications of the out-of-band subsystem 106 and the wireless communication subsystem 102.

In one embodiment, the out-of-band communication interface 108 uses near field communication (NFC). NFC is a short range wireless communication method with a typical communication range between zero centimeters (cm) and 20 cm, and ranges therebetween. The IVRS 100 can use NFC for secure out-of-band communication with portable devices. The IVRS 100 can use the out-of-band communication interface 108 to securely exchange information with a portable device via a near field communication link. The IVRS 100 can request identifying information from the portable device 110. The portable device 110 sends identifying information (e.g., serial number of the portable device 110) to the IVRS 100 via the out-of-band communication interface 108. The portable device 110 can request network credentials via the out-of-band communication interface 108. The IVRS 100 provides network credentials to the portable device 110 via the out-of-band communication interface 108. The IVRS 100 can provide the network credentials in response to, for example, the portable device providing identifying information, the portable device 110 requesting network credentials, the IVRS identifying the portable device 110 as an authorized device among a list of authorized devices, or any combination thereof. The portable device 110 can use the network credentials to connect to the wireless communication subsystem 102.

Figure 2:
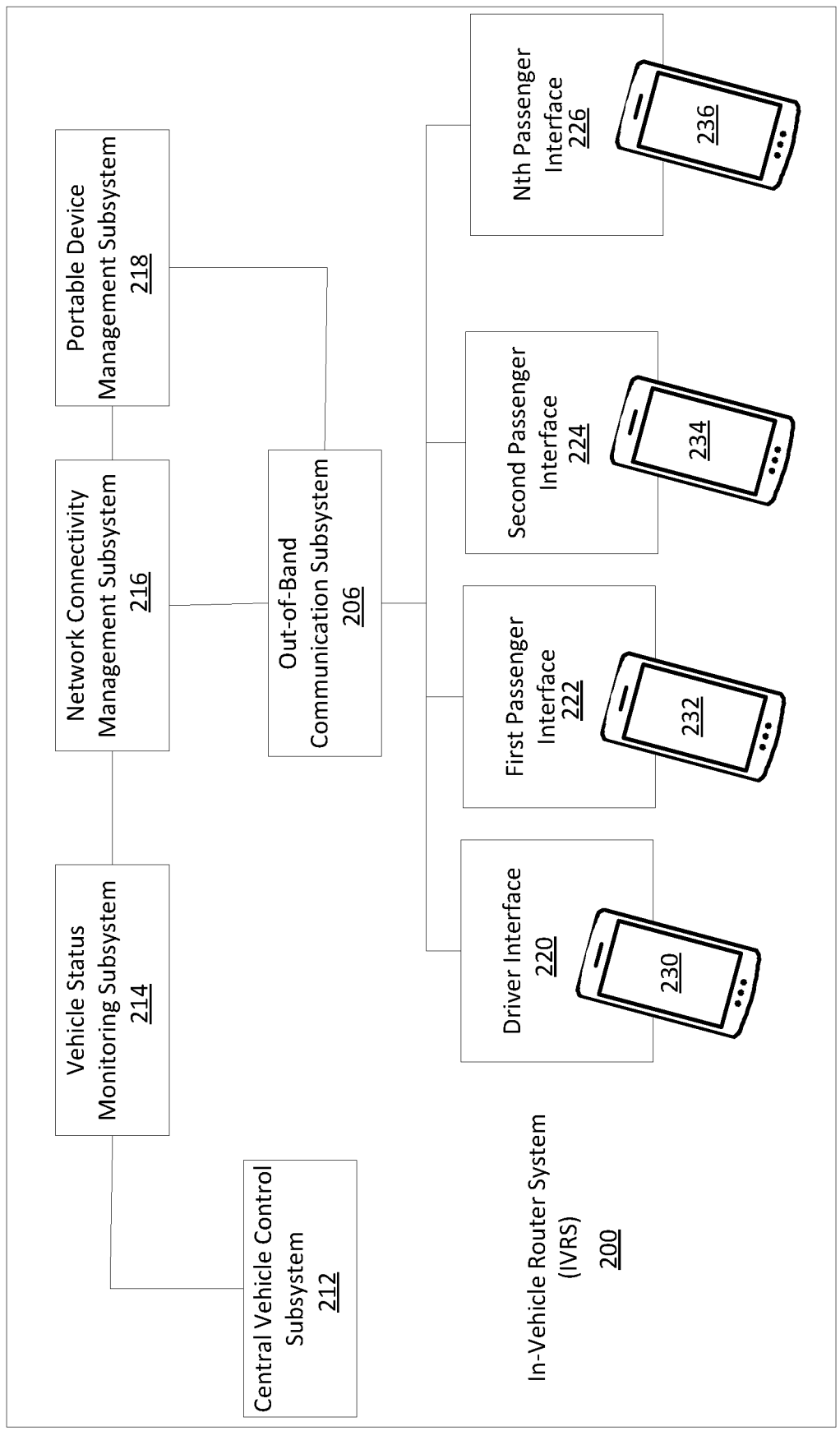
FIG. 2 is a block diagram illustrating an in-vehicle router system configured to distinguish a first user type from a second user type.

FIG. 2 is a block diagram illustrating an in-vehicle router system (IVRS) 200 configured to distinguish a first user type from a second user type. The first user type can be users identified as being a driver of a vehicle. The second type of users can be users identified as being a passenger of a vehicle. Various user types are contemplated, including other user designations and devices that are not associated with a particular user designation. Embodiments should not be construed as being limited to passengers and drivers.

The IVRS 200 can include a central vehicle control subsystem 212, vehicle status monitoring subsystem 214, network connectivity management subsystem 216, portable device management subsystem 218, out-of-band communication subsystem 206 (e.g., the out-of-band communication subsystem 106), and a plurality of out-of-band communication devices.

The network connectivity management subsystem 216 manages the out-of-band communication subsystem 206 and an in band communication subsystem (e.g., the wireless communication subsystem 102). The out-of-band communication subsystem 206 manages communications between the plurality of out-of-band communications devices and one or more portable devices (e.g., portable device 230, portable device 232, portable device 234, and portable device 236).

The plurality of out-of-band communication devices can include a driver interface 220, first passenger interface 222, second passenger interface 224, and any number of Nth passenger interfaces 226. The driver interface 220 is located within a proximity of a driver seat in a vehicle. A number of passenger interfaces included in a vehicle can vary based on vehicle design. For example, more passenger interfaces may be included in a bus or airplane than in a sedan. Some embodiments include having an interface in proximity to each passenger seat and other embodiments include interfaces intended to be shared by passengers. FIG. 2 shows the first passenger interface 222, second passenger interface 224, and any number of Nth passenger interfaces 226 which are not located within a proximity of the driver seat. For example, the first passenger interface 222 can be located in a proximity of a front passenger seat. The second passenger interface 224 and any number of Nth passenger interfaces can be located in a proximity of the rear passenger seat(s).

The IVRS designates a classification to the one or more portable devices based on communications between the one or more portable devices and the out-of-band communication subsystem 206. For example, the portable device 230 communicates with the driver interface 220, and the IVRS designates the portable device 230 as being operated by first user type (e.g., a driver). In another example, the portable device 232 communicates with the first passenger interface 222, and the IVRS designates the portable device 232 as being operated by a second user type (e.g., a passenger). A user type designation is used to determine authorized communications permitted for portable devices. For example, communication from the portable device 230, designated as a driver device, can be restricted by the IVRS during a duration of a particular vehicle status (e.g., while a vehicle is determined to be in motion).

Figure 3:
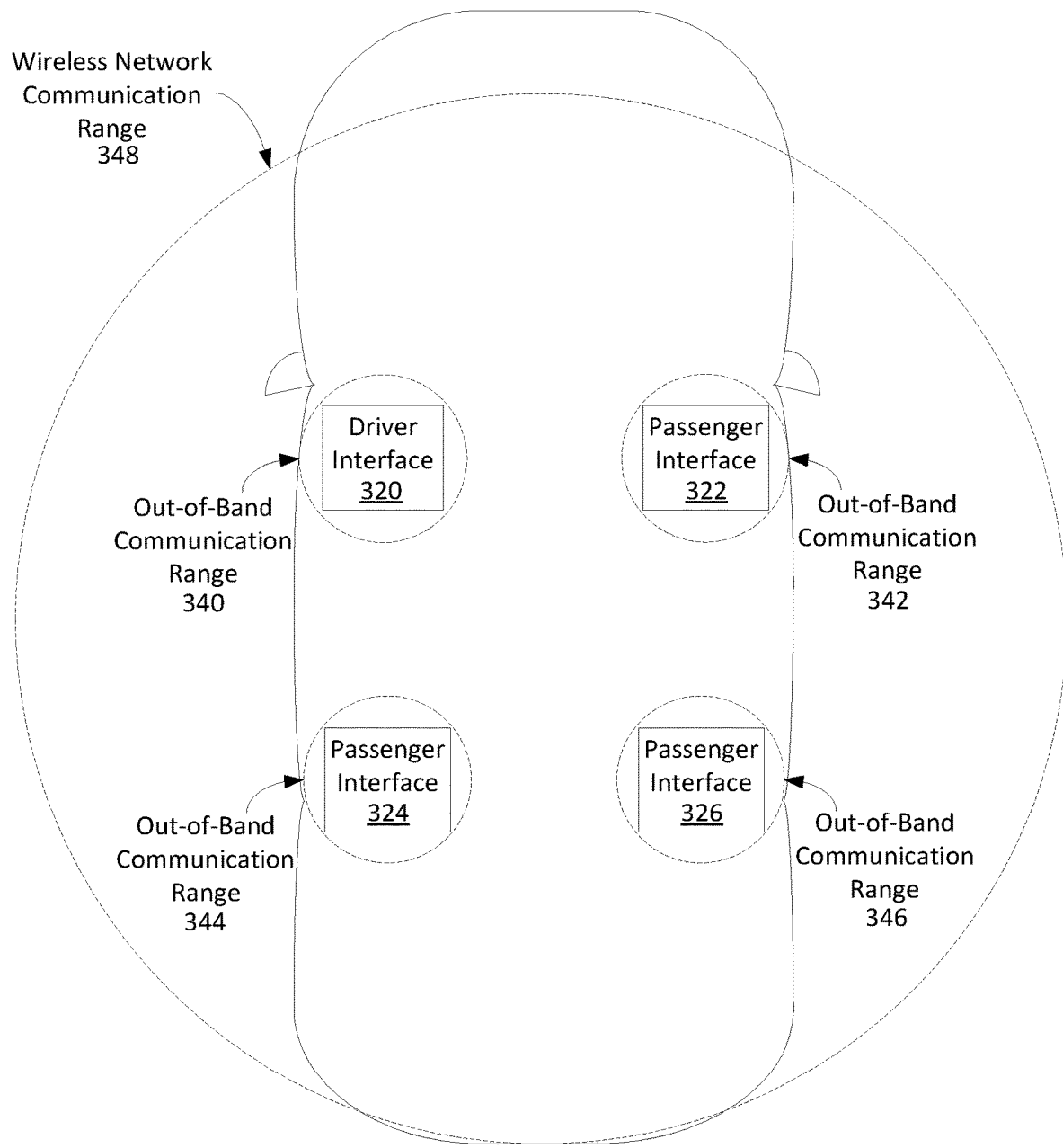
FIG. 3 is an illustration of an in-vehicle router system having a plurality of out-of-band interfaces used to distinguish a first user type from a second user type.

FIG. 3 is an illustration of an in-vehicle router system having a plurality of out-of-band interfaces (e.g., driver interface 320, passenger interface 322, passenger interface 324, and passenger interface 326) used to distinguish first user type from a second user type. The plurality of out-of-band interfaces each have a communication range (e.g., out-of-band communication ranges 340, 342, 344, and 346). For example, if an out-of-band interface is a near field communication device, the communication range for the out-of-band interface can range from approximately 0 cm to approximately 20 cm, and ranges therebetween. Each out-of-band interface of the plurality of out-of-band interfaces is located in a distinct region of a vehicle such that the communication ranges of the out-of-band interfaces do not overlap. Since the communication range of one out-of-band interface does not overlap with that of another out-of-band interface, it is unlikely that a portable device will communicate with two out-of-band interfaces simultaneously. Arranging the out-of-band interfaces in distinct regions of the vehicle and restricting a communication range of the out-of-band interfaces increases a probability of a portable device being located in a region of a vehicle associated with a particular out-of-band interface.

An out-of-band communication range (e.g., out-of-band communication range 340) is smaller than an in band communication range (e.g., wireless network communication range 348). Each in band communication device is within a wireless network communication range 348. Thus, a portable device receiving wireless network credentials from an out-of-band interface can connect to the wireless network without needing to move relative to the vehicle's position.

In an embodiment, the vehicle has an IVRS equipped with multiple near field communication (NFC) modules (e.g., driver interface 220 and passenger interface 222), known as NFC pads, placed at various locations within the vehicle. At least one NFC pad is always present near the driver. Vehicle occupants often carry at least one electronic portable device into the vehicle. Portable electronic devices equipped with NFC can request network access and other IVRS services by communicating with the IVRS through an NFC pad. When a portable device requests service from the IVRS, it sends information about itself to the IVRS. Such information may include, but not be limited to, a Wi-Fi MAC (Media Access Control) address, a Bluetooth MAC address, a mobile number, and an IMEI (International Mobile Station Equipment Identity) number. The IVRS in turn provides the portable device with network and service details. These network and service details may include, for example, wireless network name (SSID—Service Set Identifier) and password (PSK—pre-shared key). The portable device can then use the network access details to connect to the in-vehicle wireless network. The IVRS can use the received portable device details along with the location of the NFC pad that the portable device used to initiate communication to manage the network activity of the portable device.

Figure 4:
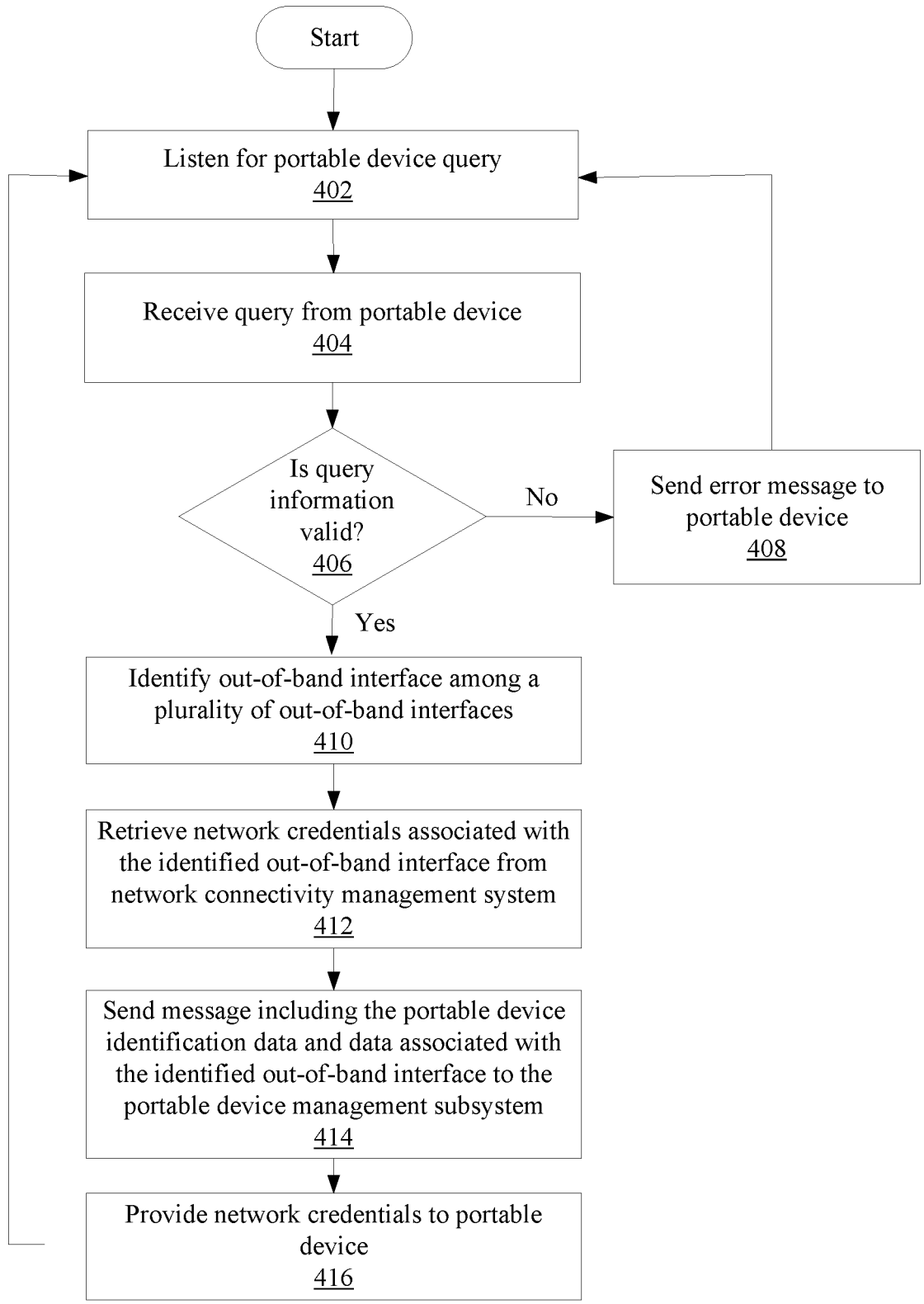
FIG. 4 is a flow diagram of a process for distinguishing a first user type from a second user type.

FIG. 4 is a flow diagram of a process for distinguishing a first user type from a second user type. An out-of-band communication subsystem (e.g., the out-of-band communication subsystem 206) can perform a number of functions including enabling communication between the IVRS and portable devices, identifying the location of an out-of-band interface (e.g., an NFC pad) from which the portable device initiated the communication, and providing the portable device details and out-of-band interface location information to the Portable Device Management Subsystem (PDMS). More specifically, the out-of-band communication subsystem of the IVRS can listen for a query from a portable device (step 402), receive query from the portable device (step 404), determine whether query information from the portable device is valid (decision 406), send an error message to the portable device if a query is invalid (step 408), identify an out-of-band interface among a plurality of out-of-band interfaces (step 410), retrieve network credentials associated with the identified out-of-band interface from a network connectivity management system (NCMS) (step 412), send message including the portable device identification data and data associated with the identified out-of-band interface to the portable device management subsystem (PDMS) (step 414), and provide network credentials to the portable device (step 416).

When a portable device comes within the communication range of one of the IVRS' out-of-band interfaces (e.g., an NFC pad), the portable device initiates a network and service query. The query contains information about the portable device such as the Wi-Fi MAC address, Bluetooth MAC address, IMEI number, mobile number, and portable device owner name. If the portable device query is valid, the out-of-band communication subsystem (e.g., the out-of-band communication subsystem 206) determines the location of the NFC pad. The out-of-band communication subsystem sends a query containing the NFC pad location to the Network Connectivity Management Subsystem (NCMS) (e.g., network connectivity management subsystem 216). The NCMS has access to a configuration dataset that maintains information about the network and services provided by the system along with the NFC pad location where they are available. For example, an NFC pad associated with the driver can have access to Bluetooth network details associated with the head console whereas rear seat passenger NFC pads may not have access to Bluetooth network details associated with the head console. Once the out-of-band communication subsystem receives the response from the NCMS, the out-of-band communication subsystem prepares a response message containing network access and service details. The response message is then sent back to the portable device. The out-of-band communication subsystem also sends a message containing the information received from the portable device and the NFC pad location to the Portable Device Management Subsystem (PDMS) (e.g., portable device management subsystem 218). Once all of the information has been passed through the IVRS, the portable device may use the network access and service details received from the out-of-band communication subsystem to access the IVRS networks and services.

Figure 5:
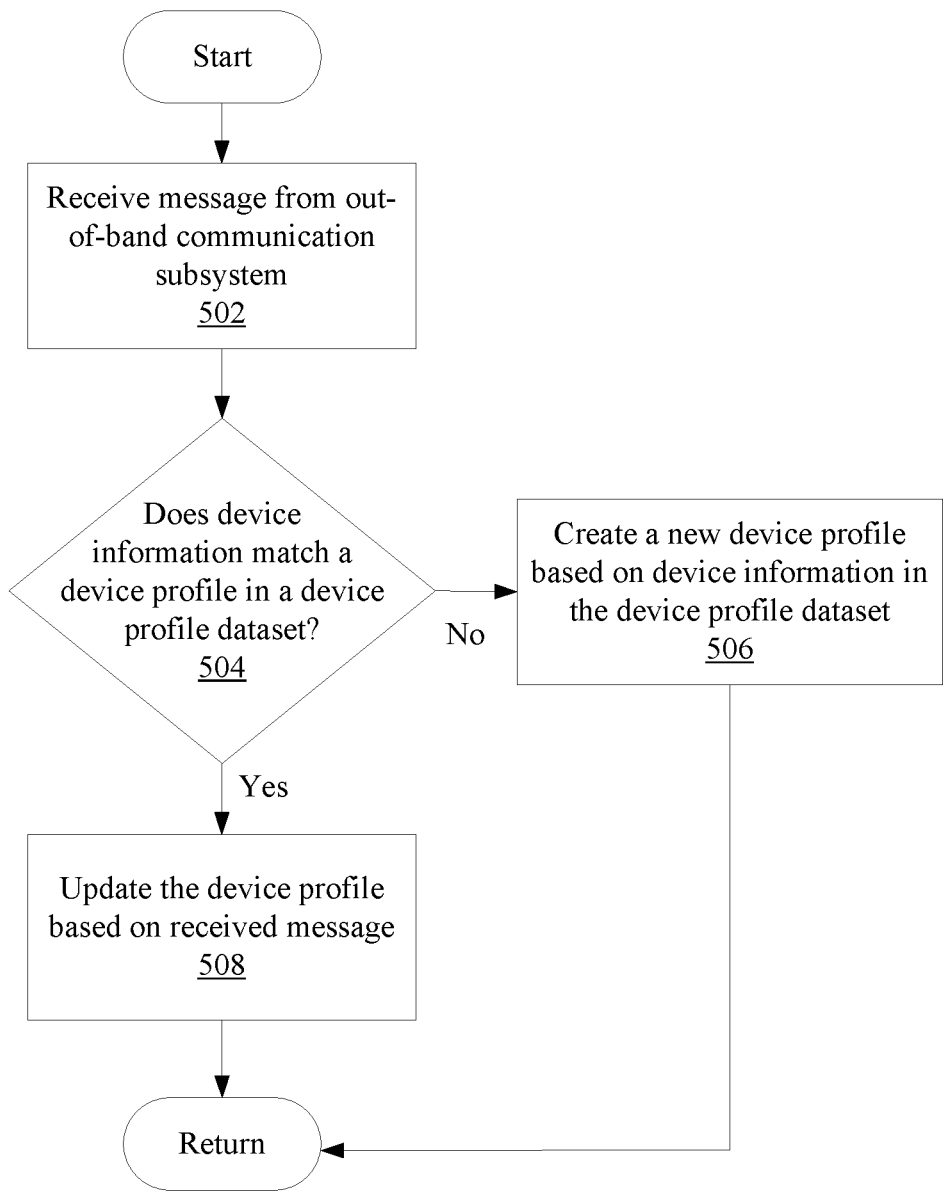
FIG. 5 is a flow diagram of a process for servicing out-of-band communication messages.

FIG. 5 is a flow diagram of a process for servicing out-of-band communication messages. A portable device management subsystem (PDMS) (e.g., portable device management subsystem 218) maintains an up-to-date dataset of the portable device by processing messages received from the out-of-band communication subsystem and the network connectivity management subsystem (NCMS) (e.g., network connectivity management subsystem 216). The PDMS services requests from other subsystems, including the network connectivity management subsystem (NCMS) for portable device details.

The PDMS receives a message from the out-of-band communication subsystem (step 502). The message includes portable device identification information, such as, Wi-Fi MAC address, Bluetooth MAC address, IMEI number, mobile number, and portable device owner name. The PDMS determines if a device profile already exists for the portable device in a device profile dataset (decision 504). If an entry already exists (decision 504, Yes), the PDMS updates the device profile with any new information (step 508). If the device profile does not exist or a device profile corresponding to the portable device identification information is otherwise not found (decision 504, No), the PDMS creates a new device profile based on the portable device identification information in the device profile dataset (step 506). The Device Profile Dataset (DPD) allows other subsystems such as the NCMS to query for device details within a device profile among a plurality of devices.

Figure 6:
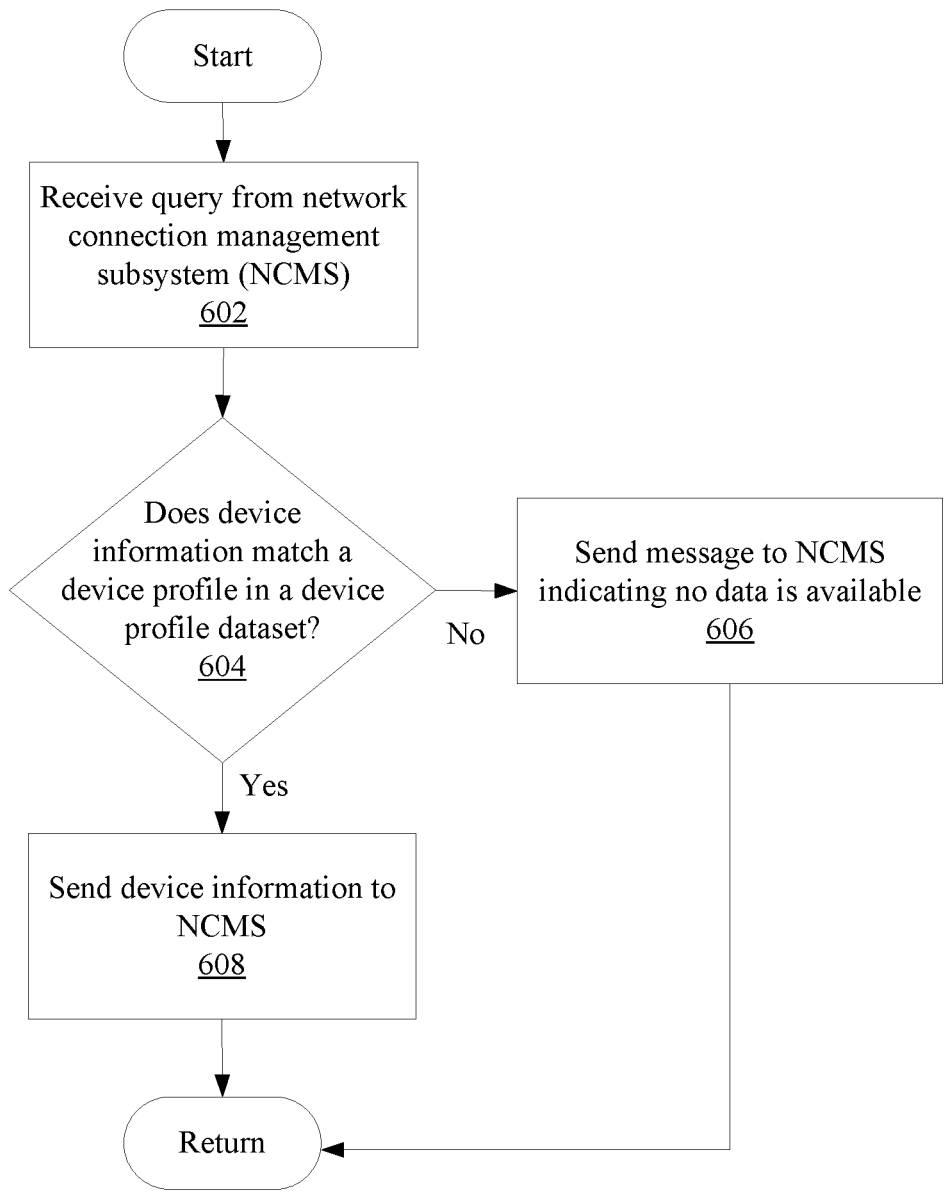
FIG. 6 is a flow diagram of a process for servicing out-of-band communication requests.

FIG. 6 is a flow diagram of a process for servicing out-of-band communication requests. The PDMS can service queries from other subsystems including, for example, queries from the network connectivity management subsystem (NCMS). The PDMS can receive a query from the NCMS (step 602), determine whether the query matches a parameter of the device profile dataset (e.g., if device information matches a device profile) (decision 604), send a message to the NCMS indicating no data is available if no match is determined (step 606), and send information associated with the queried parameter if a match is determined (step 608).

A query from the NCMS can be based on any parameter of the Device Profile Dataset. The NCMS can query for a single device or a group of devices. For example, it may query for a list of all Wi-Fi devices or a device associated with a particular region by providing an NFC pad location.

When the PDMS receives a query request from the NCMS, it searches for devices that satisfy the criteria. If the search is successful (decision 604, Yes), a message with the queried parameter (e.g., device details) is formulated and sent to the NCMS as a response. If the search fails to identify a match (decision 604, No), an error message is sent back to the NCMS indicating no device met the search criteria.

Figure 7:
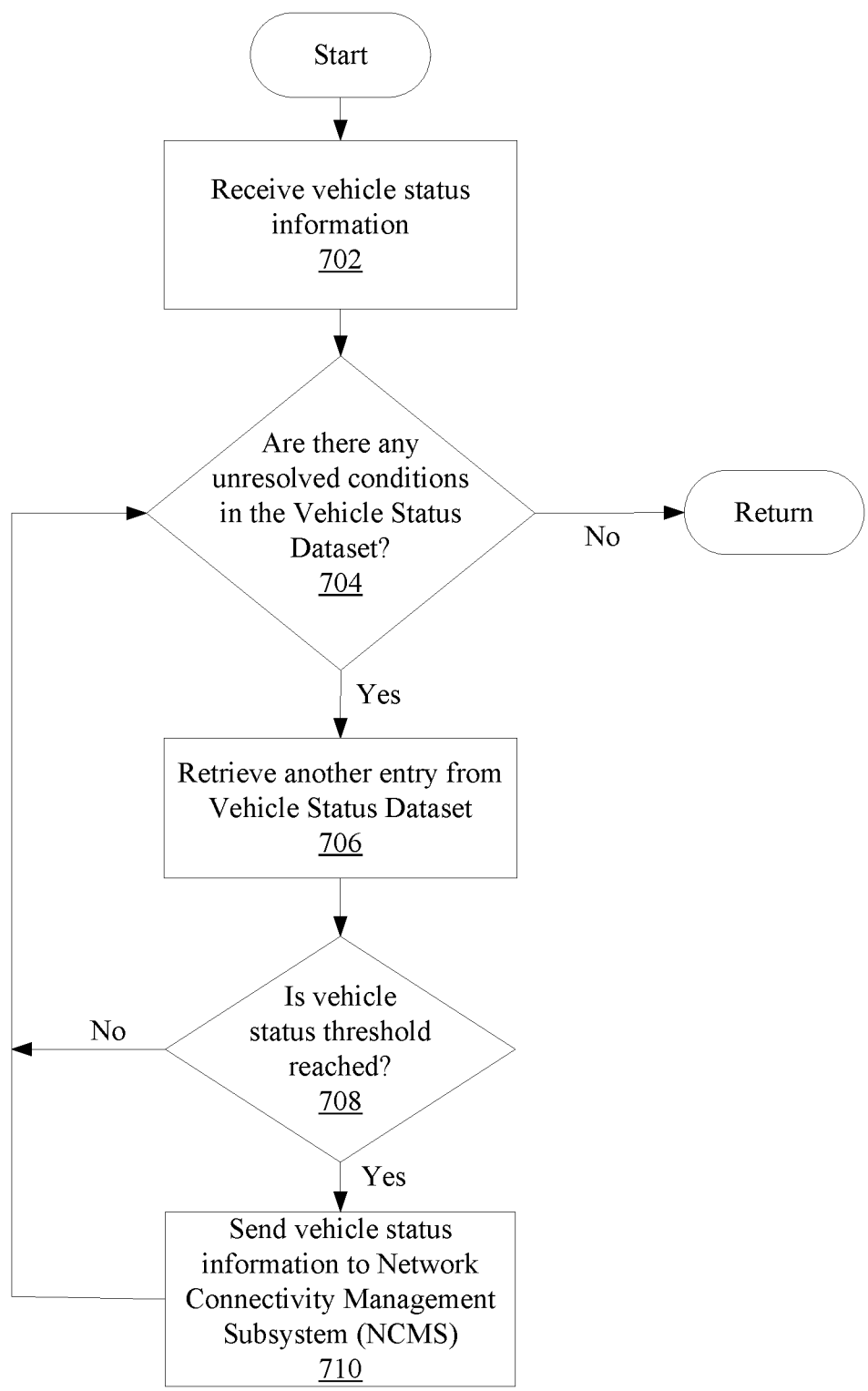
FIG. 7 is a flow diagram of a process for managing vehicle status information.

FIG. 7 is a flow diagram of a process for managing vehicle status information. A vehicle status monitoring subsystem can manage the vehicle status information. The vehicle status monitoring subsystem is responsible for receiving and processing real-time vehicle status information and alerting the NCMS to manage network activity of connected devices.

The vehicle status monitoring subsystem can receive vehicle status information from an on-board diagnostic system configured to retrieve data from a plurality of sensors to indicate a status of various vehicle subsystems (e.g., vehicle speed, revolutions per minute, fuel level, seat occupancy, seat belt status, object detection, air bag deployment, etc.) (step 702), determine whether there are any unresolved conditions in the vehicle status dataset (decision 704), retrieve another entry from vehicle status dataset if unresolved conditions exist (step 706), determine whether a vehicle status threshold is reached (decision 708), and send vehicle status information to the NCMS if a vehicle status threshold is reached (step 710).

Vehicle data from on-board diagnostic (OBDII) information and proprietary vehicle manufacture status information are examples of the types of data elements that may be included in the real-time vehicle status information. The vehicle status monitoring subsystem analyzes this information based on preconfigured thresholds. For example, a threshold could be numerical value selected from a range of possible values such as a speed exceeding zero miles per hour, revolutions per minute exceeding 1000, an object is detected within one meter of the vehicle, etc. In another example, a threshold can be based on an event being detected such as a driver seat detected as occupied, driver seat belt detected as engaged, airbag detected as deployed, or collision detected. If a threshold is exceeded, the vehicle status monitoring subsystem sends messages to the NCMS to manage the network activities of portable devices connected to the in-vehicle network. The Vehicle Status Dataset (VSD) contains information necessary to translate the current vehicle conditions to actionable network management activities. A VSD may include vehicle parameters, respective threshold values, and a predefined vehicle state.

In one embodiment, revolutions per minute (RPMs) along with other vehicle status information such as seat sensor, seat belt, and/or brake pedal position are used to determine vehicle movement for the purpose of ensuring that network and service access for all portable devices are properly managed even when the vehicle is temporarily stationary. Such stationary conditions may exist when the vehicle is stopped at a traffic signal or in traffic congestion.

The following represent example Vehicle Status Datasets:
Ex. 1: Vehicle parameter: vehicle speed
Threshold value limit: 10 mph
State: moving
Ex. 2: Vehicle parameter: parked
Threshold value limit: none
State: vehicle parked
Ex. 3: Vehicle parameter: driver seat sensor
State: occupant detected
Ex. 4: Vehicle parameter: driver seat belt
State: buckled
Ex. 5: Vehicle parameter: RPM
Threshold value limit: 2000
State: moving An example of when the vehicle status monitoring subsystem might send a message containing a VSD to the NCMS occurs when the vehicle exceeds a threshold speed for a threshold duration. When the vehicle status monitoring subsystem confirms that the vehicle RPM threshold is exceeded and driver seat belt status is "buckled" and driver seat sensor detected driver presence, it may inform the NCMS to apply network access restrictions. Similarly when the vehicle RPM is below a threshold, and vehicle status monitoring subsystem has previously informed the NCMS to apply restrictions, then it informs the NCMS to relax (or eliminate) the network access restrictions. Similarly, if the vehicle status monitoring subsystem receives vehicle alert alarms, it then sends a high priority message to the NCMS indicating the vehicle alarm status.

As described further below, various kinds of restrictions and/or other predefined actions can be applied or taken in relation to portable devices, based on vehicle status information.

In an embodiment, a network connectivity management subsystem (NCMS) (e.g., network connectivity management subsystem 216) can manage the network activity of the IVRS, control access to the IVRS services, and control access to the IVRS network.

The NCMS has access to a network and service configuration dataset for all the networks and services that can be made available to the vehicle occupants through portable devices. The network can be a wireless local area network (e.g., Wi-Fi LAN, Wi-Fi direct, and/or a Bluetooth network). The network can provide wired connections, such as a universal serial bus (e.g., USB 2.0, USB 3.0, etc.) or a proprietary computer bus (e.g., Lightning®). The configuration dataset also contains information of services that are available at various locations within the vehicle. Examples of such services are Internet Access, Digital Living Network alliance (DLNA) service, entertainment streaming service, head console navigation management and head console entertainment management. For each of the networks, the configuration dataset can be configured with network access parameters and the location of NFC pads where the details can be shared with a portable device. Similarly, for each of the services, the configuration dataset can be configured with service details and the location of NFC pads where the details may be shared with a portable device.

The NCMS maintains a predefined set of actions it can take based on the vehicle status information. The NCMS receives the vehicle's current status information from the vehicle status monitoring subsystem and connected device information from the PDMS. Based on the vehicle status information, the NCMS can, for example, prohibit passenger device interaction with the head console of a moving vehicle. The NCMS can use the location of the NFC pad that a portable device used to initiate IVRS network access to determine what actions to take. Examples of the actions that may be taken include, applying restriction on connectivity between portable devices within the vehicle, applying restrictions on access to In-Vehicle entertainment services, informing the portable device's operating system to manage voice and text based application connectivity, informing the mobile service provider to manage calls, SMS messages and data connectivity, and applying network traffic prioritization.

In an embodiment, the IVRS identifies wireless connection details to provide to a portable device based on the location of the out-of-band interface (e.g., NFC pad) from which a connection request initiated. A portable device touches an NFC pad, initiating a communication link (e.g., an NFC link) with the out-of-band communication subsystem. The out-of-band communication subsystem forwards the appropriate wireless network and service details to the portable device based on the location of the NFC pad. A wireless network for first user type can be different that a wireless network for a second user type. For example, if a portable device is associated with a driver, wireless network credentials sent to the portable device can be to a first wireless local area network (e.g., a 5 gigahertz band) and if another portable device is associated with a passenger, the wireless network credentials sent to the another portable device can be to a second wireless local area network (e.g., a 2.4 gigahertz band). Information transmitted to a portable device can include network details to connect to the NCMS over the wireless network in order to obtain network access and a unique random identifier to be provided to the NCMS over the wireless network.

While keeping the out-of-band connection (e.g., NFC link) active, the portable device establishes a wireless network connection to the NCMS and provides the NCMS with the unique identifier, and the portable device's device details, which may include Wi-Fi MAC, Bluetooth Mac, IMEI number, etc.

When the NCMS receives the portable device's client connection request over the wireless network and receives the unique random identifier, it can map the NFC pad location to the wireless network configuration details of the portable device. An application on the portable device can then terminate the NFC communication and the NCMS connection. The NCMS will grant the appropriate network and service access to the portable device.

Some embodiments include an optional additional SMS validation step. If the application running on the portable device provides an international mobile equipment identity (IMEI) number to the NCMS as part of the portable device's details, the NCMS may also send an SMS message to the portable device containing a second unique random data key.

An application running on the portable device can receive the SMS and forward the unique random data key to the NCMS over the wireless network connection. The NCMS receives the second unique random data key and notifies the portable device of successful access validation.

The NCMS manages the Internet Protocol (IP) communication among all devices connected to the vehicle IP network. The network and service access are managed based on vehicle state (e.g., driving environment/condition). Since the vehicle state (e.g., environmental/condition) can change at any time, the NCMS and the vehicle status monitoring subsystem work in a real-time environment managing the devices and service access of all the devices connected to the IVRS and take appropriate actions to limit driver distraction.

If the VSD message for the current vehicle environment directs minimization of driver distraction, then the NCMS takes actions to limit driver portable device's communication with other devices and services (both in the vehicle and outside the vehicle). The NCMS can prohibit IP connectivity between the driver's portable device and other devices connected to the IVRS. The NCMS can prioritize IP network traffic between WAN and devices connected to the vehicle IVRS. As a result, once it determines that driver distraction is to be minimized, the NCMS can restrict IP traffic between the driver's portable device and the WAN only to certain types of network traffic. For example, the IVRS can restrict IP application data related to web browsing, IP telephony, IP based chat services. However, it can allow map related data communication between the driver's portable device and the WAN so that navigation applications can function.

If the VSD indicates a high priority alert status such as an accident, a vehicle break down, etc., then NCMS can limit audio/video streaming and other high bandwidth data over the interfaces and only allow IP appropriate traffic from the portable device of the driver over the WAN interface.

Similarly, if a vehicle is not moving, the NCMS will allow a passenger's portable device to stream video to the head console. However, when the NCMS receives a message from the vehicle status monitoring subsystem indicating that the vehicle is moving, the NCMS can automatically block the streamed video to the head console to avoid driver distraction.

Figure 8:
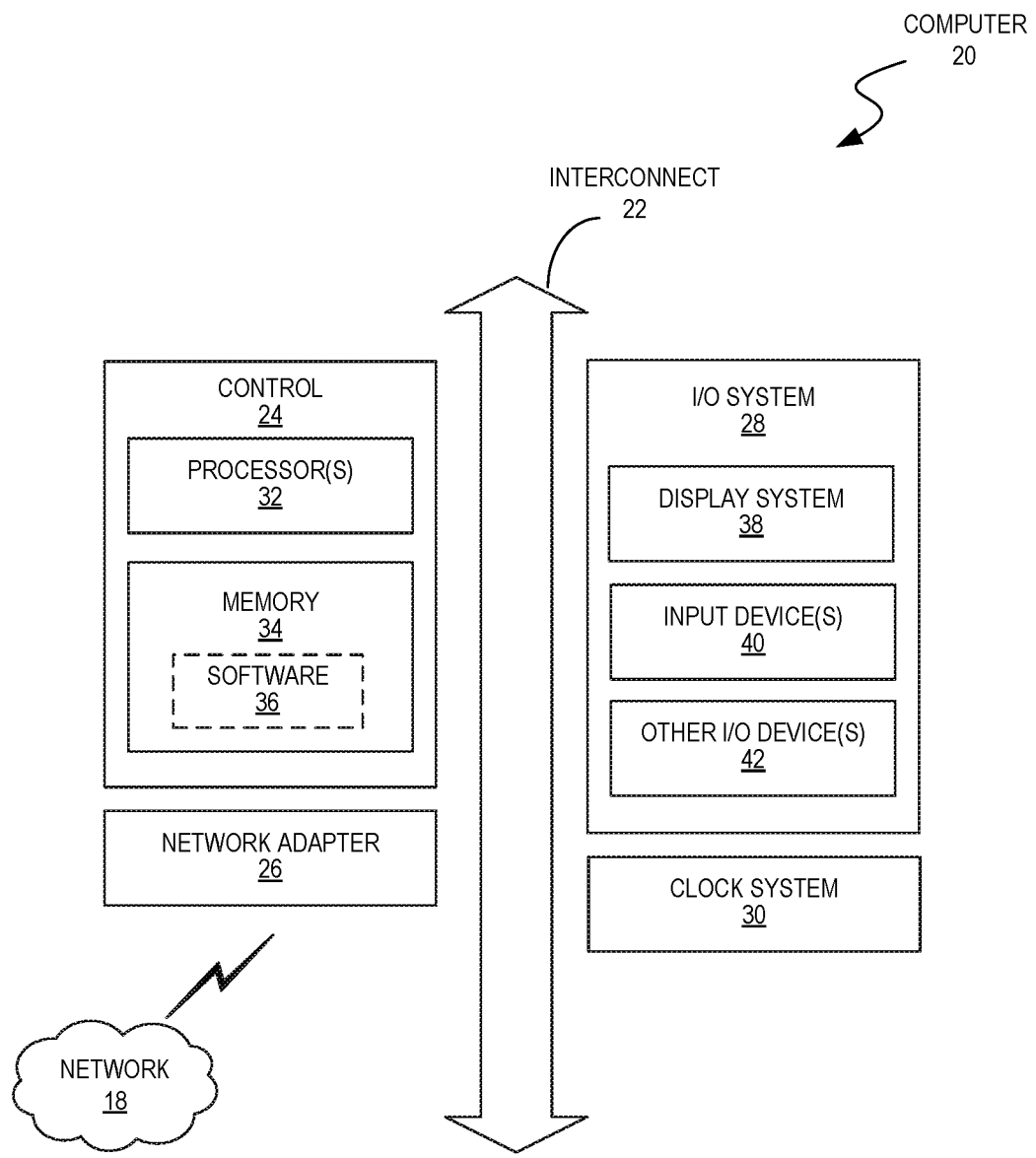
FIG. 8 is a block diagram of a computer system as may be used to implement features of some embodiments of the disclosed technology.

FIG. 8 is a block diagram of a computer system as can be used to implement features of some embodiments of the disclosed technology. The computing system 20 can be used to implement any of the entities, components or services depicted in the examples of FIGS. 1-7 (and any other components described in this specification). The computing system 20 can include one or more central processing units ("processors") 32, memory 34, input/output devices 38, 40, and 42 (e.g., keyboard and pointing devices, display devices), and network adapters 26 (e.g., network interfaces) that are connected to an interconnect 22. The interconnect 22 is illustrated as an abstraction that represents any one or more separate physical buses, point to point connections, or both connected by appropriate bridges, adapters, or controllers. The interconnect 22, therefore, can include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 34 is a non-transitory computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection.

The instructions stored in memory 34 can be implemented as software 36 and/or firmware to program the processor(s) 32 to carry out actions described above. In some embodiments, such software 36 or firmware can be initially provided to the computing system 20 by downloading it from a remote system through the computing system 20 (e.g., via network adapter 26).

The techniques introduced here include a method and system for managing communications between an in-vehicle router system and one or more portable devices in a vehicle. The in-vehicle router system includes a plurality of out-of-band interfaces used to determine a user type associated with a portable device prior to connection with a wireless access point (AP). Communications with portable devices associated with different user types can be managed differently. In addition, vehicle status information can be used to manage communications between the in-vehicle router system and a portable device. Embodiments include restricting a user device associated with a particular user type (e.g., a driver) if a particular vehicle state (e.g., in motion) is determined based on the vehicle status information. Managing communications based on user types and vehicle states can enable safe communication for particular users under particular vehicle states while reducing risky communication for other users. Since a vehicle is dynamic with constantly changing vehicle states, so too is the in-vehicle router system by adjusting communication restrictions for particular user types for different vehicle states. Thus, the in-vehicle router system can provide safe access to in-vehicle wireless network when the circumstances permit and deny or restrict access to the in-vehicle wireless network in risky situations.

What is claimed is:

1. An apparatus comprising:
   a wireless access point (AP) to facilitate communications within a vehicle via a first type of wireless communications link; and
   at least one processor configured to, when in operation:
   receive a message from a portable device via a wireless interface of a plurality of wireless interfaces for use in providing communications within the vehicle via a second type of wireless communications link that has a shorter range than the first type of wireless communications link, wherein at least two of the plurality of wireless interfaces are associated with different user types of a plurality of user types, and wherein the message is indicative that the portable device seeks access to the wireless AP; and determine a level of access to the wireless AP to grant to the portable device based on which of the plurality of wireless interfaces received the message.

2. The apparatus of claim 1, wherein each of the plurality of wireless interfaces is designated for use in wireless communication that is out-of-band relative to the wireless AP.

3. The apparatus of claim 1, wherein determining the level of access is further based on vehicle status information.

4. The apparatus of claim 1, further comprising:
a vehicle status monitoring subsystem to connect to a plurality of sensors configured to report a plurality of vehicle parameters to the vehicle status monitoring subsystem.

5. The apparatus of claim 4, wherein the vehicle status information includes information about at least one of: speed, acceleration, revolutions per minute, fuel level, seat occupancy, seat belt state, state of hazard lights, vehicle alarm, nearby object detection, or collision detection.

6. The apparatus of claim 1, further comprising:
a vehicle status monitoring subsystem configured to transmit vehicle status information upon the vehicle status information exceeding a specified threshold.

7. The apparatus of claim 6, wherein the specified threshold is exceeded if the vehicle is in motion, a seat is occupied, or an object is detected within a predefined distance from the vehicle.

8. The apparatus of claim 1, further comprising:
an on-board diagnostic system connected to a plurality of sensors, the plurality of sensors being configured to report vehicle status information to the at least one processor.

9. The apparatus of claim 1, wherein the plurality of wireless interfaces include at least one of a near field communication interface, a short message service interface, a Bluetooth interface, or a ZigBee interface.

10. The apparatus of claim 1, wherein the at least one processor is configured to:
provide a unique identifier to the portable device via the wireless interface; and
receive the unique identifier from the portable device via the wireless AP,
wherein determining the level of access of the portable device is further based on the received unique identifier.

11. The apparatus of claim 1, further comprising:
a portable device management system to maintain a device profile dataset, wherein the portable device management system is configured to perform a method comprising:
receiving identification information of the portable device, wherein the message causes the portable device management system to perform either of:
if the identification information does not match any device profile in a device profile dataset, create a new device profile based on the identification information of the portable device; or
if the identification information does match a device profile in the device profile dataset, update the device profile based on the identification information of the portable device.

12. An in-vehicle router system comprising:
a wireless access point (AP) to facilitate communications via a first communications link; and
at least one processor configured to, when in operation:
receive a message from a portable device by a wireless interface of a plurality of wireless interfaces via a second communications link, the message being indicative that the portable device seeks access to the wireless AP,
wherein the second communications link has a shorter range than the first communications link, and
wherein at least two of the plurality of wireless interfaces are associated with different user types of a plurality of user types; and
determine a level of access to the wireless AP to grant to the portable device based on which of the plurality of wireless interfaces received the message.

13. The in-vehicle router system of claim 12, wherein the first communications link is out-of-band relative to the second communications link.

14. The in-vehicle router system of claim 12, further comprising:
a vehicle status monitoring subsystem configured to transmit vehicle status information upon the vehicle status information exceeding a specified threshold, wherein the specified threshold is exceeded if the vehicle is in motion, a seat is occupied, or an object is detected within a predefined distance from the vehicle.

15. The in-vehicle router system of claim 14, an on-board diagnostic system connected to a plurality of sensors, the plurality of sensors being configured to report vehicle status information to the vehicle status monitoring subsystem.

16. A method comprising:
receiving a message via a short-range wireless interface from a portable device, the short-range wireless interface among a plurality of wireless interfaces within a vehicle, the plurality of wireless interfaces including a first type of wireless interface and short-range wireless interfaces that have a shorter range than the first type of wireless interface, each of the short-range wireless interfaces being associated with a user type of a plurality of user types, wherein the message is indicative that the portable device seeks access to an in-vehicle wireless network; and
determining a level of access to the in-vehicle wireless network to grant to the portable device based on the short-range interface associated with the user type that received the message.

17. The method of claim 16, wherein the wireless interface connects with the portable device over a wireless communication link, the wireless communication link having a shorter range than the in-vehicle wireless network.

18. The method of claim 16, wherein the wireless interface is associated with a driver location in the vehicle and the user type associated with the wireless interface is a driver.

19. The method of claim 16, further comprising:
receiving vehicle status information from a vehicle status monitoring subsystem.

20. The method of claim 19, wherein the vehicle status information includes information about at least one of: speed, acceleration, revolutions per minute, fuel level, seat occupancy, seat belt state, state of hazard lights, vehicle alarm, nearby object detection, or collision detection.

21. The method of claim 19, wherein the vehicle status monitoring subsystem is configured to transmit the vehicle status information upon the vehicle status information passing a specified threshold.

22. The method of claim 16, wherein determining the level of access is further based on vehicle status information.

23. The method of claim 16, further comprising:
receiving network credentials from the portable device via the in-vehicle wireless network; and
establishing a communication link between the portable device and a wireless AP.

24. The method of claim 16, further comprising:
querying a portable device management subsystem to retrieve information about the portable device from a device profile in a device profile dataset; and
in response to the querying, receiving either of the information about the portable device or a message indicative that the information is not available.

* * * * *